US 6,637,403 B2

(12) United States Patent
Walter et al.

(10) Patent No.: US 6,637,403 B2
(45) Date of Patent: Oct. 28, 2003

(54) FUEL INJECTION CONTROL METHOD FOR A DIRECT-INJECTION INTERNAL-COMBUSTION ENGINE

(75) Inventors: Bruno Walter, Nanterre (FR); Bertrand Gatellier, Bougival (FR)

(73) Assignee: Institut Francais du Petrole, Rueil-Malmaison (FR)

( * ) Notice: Subject to any disclaimer, the term of this patent is extended or adjusted under 35 U.S.C. 154(b) by 0 days.

(21) Appl. No.: 10/200,198

(22) Filed: Jul. 23, 2002

(65) Prior Publication Data

US 2003/0019466 A1 Jan. 30, 2003

(30) Foreign Application Priority Data

Jul. 27, 2001 (FR) ............................................ 01 10149

(51) Int. Cl.$^7$ ................................. F02B 3/10; F02B 3/12
(52) U.S. Cl. ........................................ 123/299; 123/305
(58) Field of Search ................................. 123/298, 299, 123/305

(56) References Cited

U.S. PATENT DOCUMENTS

| | | | |
|---|---|---|---|
| 4,446,830 A | * 5/1984 | Simko et al. ................ | 123/299 |
| 5,363,820 A | 11/1994 | Neitz | |
| 5,720,253 A | * 2/1998 | Matoba et al. ............... | 123/298 |
| 5,740,777 A | * 4/1998 | Yamamoto et al. .......... | 123/305 |
| 6,053,144 A | 4/2000 | Fluga | |
| 6,148,792 A | * 11/2000 | Hei Ma ....................... | 123/298 |
| 6,267,096 B1 | * 7/2001 | Vallance et al. ............. | 123/305 |
| 2003/0062022 A1 | * 4/2003 | Iriya ............................ | 123/305 |

FOREIGN PATENT DOCUMENTS

| | | |
|---|---|---|
| DE | 19908454 | 9/1999 |
| EP | 0849448 | 6/1998 |

OTHER PUBLICATIONS

Patent Abstracts of Japan vol. 018, No. 579, (M–1698), Nov. 7, 1994 & JP 06 213030A (Toyota Motor Corp. Aug. 2, 1994.

Patent Abstracts of Japan vol. 018, No. 512 (M–1679), Sep. 27, 1994 & JP 06 173737 A Toyota Motor Corp., Jun. 21, 1994.

Patent Abstracts of Japan, vol. 012, No. 195 (M–705) Jun. 7, 1988 & JP 63 001710A (Nippon Clean Engine Lab Co.) Jan. 6, 1988.

* cited by examiner

Primary Examiner—Erick Solis
(74) Attorney, Agent, or Firm—Antonelli, Terry, Stout & Kraus, LLP

(57) ABSTRACT

The present invention relates to a fuel injection control method for a direct-injection internal-combustion engine comprising at least an injector (20) of fuel jet nappe angle ($a_1$), a cylinder (10), a cylinder head (12), a piston (18) sliding in this cylinder and connected to a crankshaft, and a combustion chamber delimited by wall (26) of the cylinder, cylinder head (12) and upper face (24) of piston (18).

According to the invention, the method consists in determining a lower limit position (PL) of piston (18) below which wall (26) of the cylinder is likely to be wetted by the fuel jets coming from the injector, in determining the effective position of this piston, in locating this effective position of the piston in relation to the lower limit position and in adjusting the fuel injection parameters according to the effective position of the piston in relation to the lower limit position.

9 Claims, 1 Drawing Sheet

FUEL INJECTION CONTROL METHOD FOR A DIRECT-INJECTION INTERNAL-COMBUSTION ENGINE

FIELD OF THE INVENTION

The present invention relates to a fuel injection control method intended for a direct-injection internal-combustion engine.

More particularly, it relates to a fuel injection method allowing to obtain homogeneous mixing of the fuel injected with air or with a mixture of recirculated exhaust gas and air.

BACKGROUND OF THE INVENTION

The development of internal-combustion engines has to meet requirements relative to emissions reduction, fuel consumption, torque and specific power increase, combustion noise reduction, while remaining compatible with endurance resistance criteria.

It is therefore possible to change certain parameters of the injection system (such as the pressure, the control laws, etc.) or of the fuel jets, such as the nappe angle formed by these jets at the injector nozzle.

However, improvement of one of these parameters leads to a degradation of another parameter.

Thus, this is for example the case with the injection of liquid fuel in the combustion chamber where this fuel is injected with a nappe angle determined by the type of injector used.

A modification of this angle can lead to a projection of fuel on the cylinder wall, which causes a degradation of the behaviour of the lubricant present on this wall and the formation of soots.

This has the drawback of leading to an emissions increase and/or to a reduction of the full load performances and/or to a noise increase.

As described in patent applications EP-849,448 or EP-589,178, the fuel is fed into the combustion chamber by an injector arranged in line with each cylinder, with a very wide nappe angle of the order of 140° to 160°.

By means of this injector, the fuel jets are discharged and vaporize without ever touching the cylinder wall and therefore without affecting the lubrication thereof To obtain this effect, the piston must of course be rather close to its top dead center (PMH), so that only a limited amount of latitude is available for the selection of the fuel injection times.

This drawback is by no means insignificant since it is also known that early and/or late fuel injections afford many advantages.

For example, a pilot injection before the top dead center and the main injection allows the combustion noise to be reduced.

Furthermore, as it is well-known, the regeneration of particle filters, initiated by an increase of the temperature at the exhaust, requires a fuel injection shortly before opening of the exhaust valves.

A fuel injection upon expansion or during the exhaust phase can also be useful to obtain favourable conditions at the exhaust for regeneration of the $NO_x$, traps.

Furthermore, in order to obtain a homogeneity of the fuel mixture, it may also be desirable to inject fuel early.

Since the injectors used generally have a nappe angle ranging between 140° and 160°, the injection control range is reduced so as to limit problems of lubricant dilution by fuel.

The present invention is aimed to overcome the aforementioned drawbacks by means of a fuel injection method allowing to use very varied injection conditions.

SUMMARY OF THE INVENTION

To this effect, a fuel injection control method intended for a direct-injection internal-combustion engine comprising at least an injector of fuel jet nappe angle $a_1$, a cylinder, a cylinder head, a piston sliding in this cylinder and connected to a crankshaft, and a combustion chamber delimited by the wall of the cylinder, the cylinder head and the upper face of the piston, is characterised in that it consists in:

- determining a lower limit position of the piston below which the cylinder wall is likely to be wetted by the fuel jets from the injector,
- determining the effective position of this piston,
- locating this effective position of the piston in relation to the lower limit position,
- adjusting the fuel injection parameters according to the effective position of the piston in relation to the lower limit position.

Advantageously, the method can consist in adjusting the injection parameters so as to limit the penetration of the fuel jets in the combustion chamber for any position of the piston between its lower limit position and its furthest position from the cylinder head.

Preferably, it can consist in injecting a determined amount of fuel under very high pressure, preferably above 1000 bars.

This method can consist in injecting a determined amount of fuel for a very short length of time.

It can consist in repeating the injection of a determined amount of fuel until the total amount of fuel to be injected is obtained.

The determined amount of fuel may not exceed 25% of the total amount of fuel to be injected.

Advantageously, it can consist in determining the lower limit position of the piston by means of the relation $D \times \tan(a_1/2)$, where D is the radial distance between the point of origin of the fuel jets and the cylinder wall.

The method can consist in using injection parameters to inject the fuel conventionally for any position of the piston between its lower limit position and its closest position to the cylinder head.

BRIEF DESCRIPTION OF THE DRAWINGS

Other features and advantages of the method according to the invention will be clear from reading the description hereafter, given by way of non limitative example, with reference to the accompanying drawings wherein.

DETAILED DESCRIPTION

Figure 1:
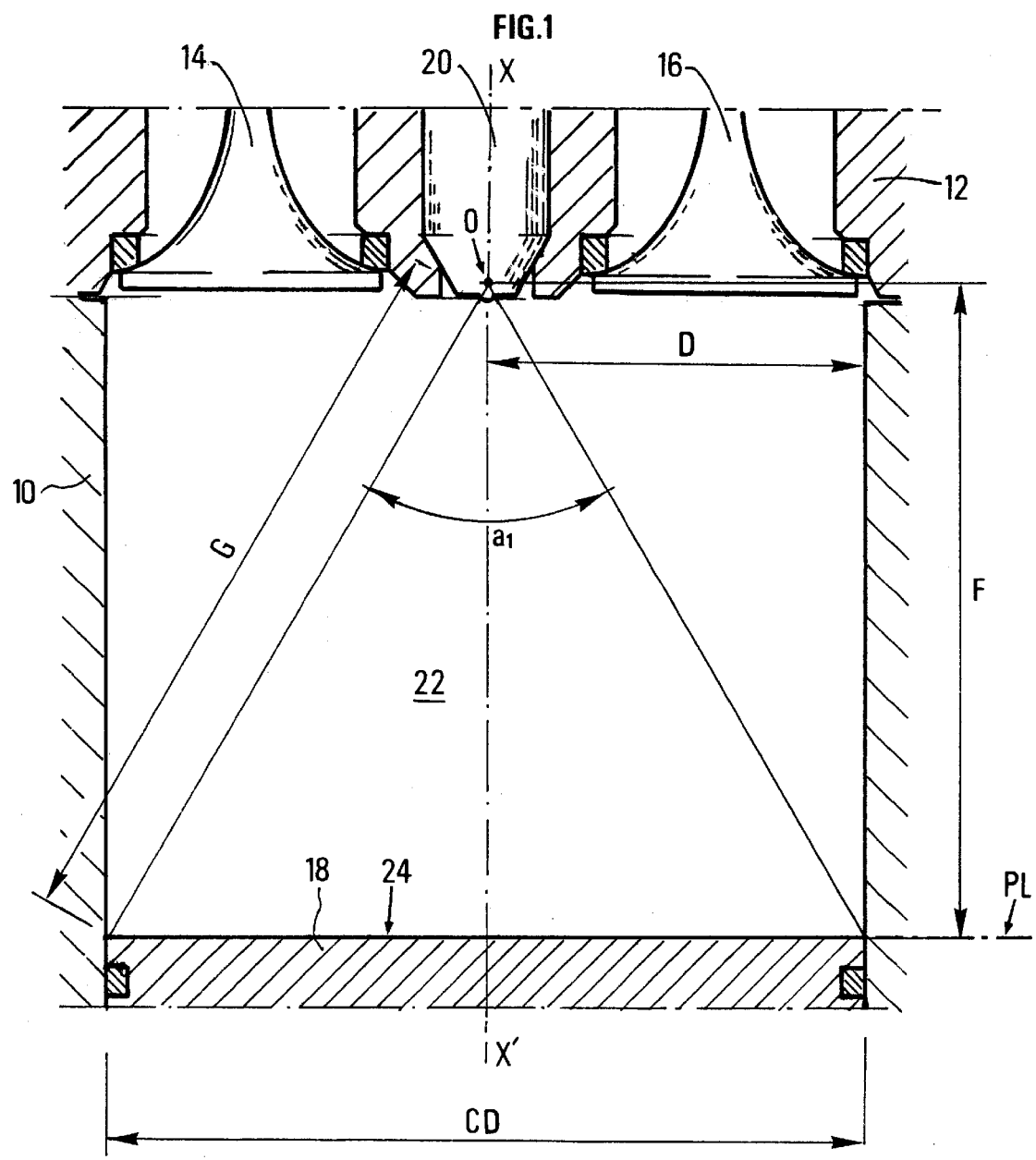
FIG. 1 diagrammatically shows an internal-combustion engine using the method according to the invention.

In FIG. 1, a direct-injection internal-combustion engine, of Diesel type for example, comprises at least a cylinder 10 of axis XX' and of diameter CD, a cylinder head 12 closing the cylinder in the upper part thereof, air delivery means and burnt gas discharge means, here respectively one or more intake valves 14, one or more exhaust valves 16, a piston 18 sliding in cylinder 10 and connected to a crankshaft (not shown), and a fuel injector 20 preferably arranged in line with axis XX' of the cylinder, which produces a fuel jet nappe 22 whose general axis, in the present example, merges with the axis of cylinder 10.

Of course, it is possible for the injector not to be arranged in line with axis XX', but in this case the general axis of the fuel jet nappe produced by this fuel injector is at least parallel to this axis XX'.

More precisely, the fuel injector is of the small nappe angle $a_1$ type and a nappe angle $a_1$ of 120° at the most, preferably ranging between 40° and 100°, is selected.

The combustion chamber is conventionally delimited on one side by cylinder head 12, on the opposite side by upper face 24 of piston 18 and laterally by wall 26 of cylinder 10.

According to the nappe angle $a_1$, selected, a lower limit position PL of piston 18 is determined, for which the fuel jets do not touch wall 26 of cylinder 10 between this position and the upper position of said piston.

This lower limit position is determined by the distance F between the point of origin O of the fuel jets from the nozzle of injector 20 and upper face 24 of the piston, and it is equal to $D \times \tan(a_1/2)$, where D is the radial distance between the point of origin O of the fuel jets and wall 26 of cylinder 10 which is the closest to this point.

In the example described, distance D is CD/2, where CD is the diameter of the cylinder.

Figure 2:
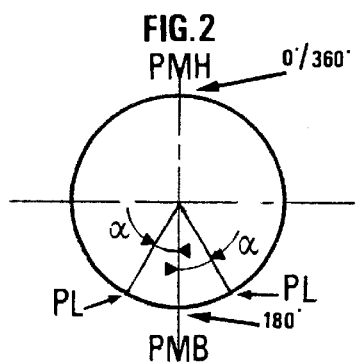
FIG. 2 illustrates the angular deflection of the crankshaft connected to the piston of the engine using the method according to the invention.

By means of a geometric calculation of the connecting rod-crank system which is usually arranged between the piston and the crankshaft, distance F allows to determine an angular position of the crankshaft, as can be seen more clearly in FIG. 2, which will give a crankshaft angle $\alpha$ from the bottom dead center (PMB).

By determining this angle $\alpha$, it can be specified that wall 26 of cylinder 10 is never wetted by the fuel for any position of piston 18 between 0° and 180°−$\alpha$ and between 180°+$\alpha$ and 360° crankshaft angle, where 0° and 360° represent the crankshaft angle at the top dead center (PMH) corresponding to an upper position of the piston, 180° the bottom dead center (PMB) corresponding to the lower position of the piston.

The top dead center (PMH and the bottom dead center (PMB) correspond to running phases of the engine where it is desirable to inject fuel, notably during the intake, compression or exhaust phase.

Two types of angular zones of the crankshaft deflection are thus determined, which correspond each to a stroke of the piston, a first type, referred to as allowed zones, between 0° and 180°−$\alpha$ or between 180°+$\alpha$ and 360°, and a second type, referred to as restrictive zone, corresponding to an angular deflection of the crankshaft between 180°−$\alpha$ and 180°+$\alpha$.

In relation to the piston stroke, this means that, in the allowed zone, wall 26 will never be wetted by the fuel with the position of piston 18 between its lower limit position and its upper position (the closest to cylinder head 12).

For the restrictive zone, the piston will thus lie between its lower limit position and its furthest position from the cylinder head.

According to the type of the zone in which the piston lies, the fuel injection parameters will be adjusted so as to inject the fuel either conventionally for the allowed zones, or using specific fuel injection adjustments for the restrictive zone.

More precisely, injection adjustments in the restrictive zone are such that the penetration of the fuel jets in the combustion chamber is limited.

The injection adjustments in the restrictive zone are therefore such that the penetration of the fuel jets, considered at the extreme lateral edges of the nappe, is less than the distance between the point of origin O of the fuel jets and wall 26 of cylinder 10.

This distance, represented by letter G in FIG. 1, is equal to $D \times \sin(a_1/2)$, where D is a distance as defined above and corresponds, in the example described, to CD/2.

To limit this penetration, a limited amount of fuel representing at most 25% of the total amount of the fuel injected is injected under high pressure, greater than or equal to 1000 bars, with a very short injection time, which allows this fuel to vaporize in the air or in the mixture of recirculated exhaust gas and air before it reaches wall 26 of the cylinder.

Of course, the injection of this limited amount of fuel will be repeated several times and, more precisely, in the example described, by means of four fuel injections equivalent to 25% of the total amount of fuel injected.

The fact that fuel injection is carried out under very high pressure allows to obtain very fine fuel droplets that form a cloud which vaporizes, in the air or in the mixture of recirculated exhaust gas and air, more readily than a liquid jet.

Of course, to favour the creation of these droplets, other parameters, such as the diameter of the injection hole of the injector, which has to be small, of the order of 100 $\mu$m, can be associated with the injection pressure and injection time adjustments.

In practice, the injection system control means usually included in an engine, such as an engine computer, contain, in the database, the lower limit position PL of piston 18 and the crankshaft angle $\alpha$ which corresponds to this lower limit position.

This computer also contains fuel injection parameters according to the allowed zones (between 0° and 180°−$\alpha$ or between 180°+$\alpha$ and 360° crankshaft angle) and according to the restrictive zone (between 180°−$\alpha$ and 180°+$\alpha$ crankshaft angle).

When the engine computer is about to give the injector the order to inject, this computer first determines the effective position of piston 18 in the combustion chamber.

This position of the piston can for example be deduced by means of an angular position detector provided on the crankshaft, which determines the crankshaft angle from the top dead center.

Once the crankshaft angle determined (and consequently the real position of the piston), the computer checks whether this angle is contained in the allowed zones or in the restrictive zone.

If this angle is in one of the allowed zones, this computer will give the injection system of the engine the order to inject fuel so that it corresponds to a conventional injection process.

If this angle is in the restrictive zone, the computer will modify the injection parameters as described above so as to limit the penetration of the fuel jet in the combustion chamber.

Thus, by means of the invention, it is possible to obtain a high amount of latitude for the selection of the injection times because the method as defined above allows to obtain a nappe of fuel jets that will not wet the cylinder walls.

The present invention is not limited to the example described above and it includes any variant.

It notably includes a gasoline type fuel injection method allowing to obtain homogeneous mixing with air or with a mixture of recirculated exhaust gas and air.

What is claimed is:

1. A fuel injection control method intended for a direct-injection internal-combustion engine comprising at least an injector (20) of fuel jet nappe angle ($a_1$), a cylinder (10), a cylinder head (12), a piston (18) sliding in this cylinder and connected to a crankshaft, and a combustion chamber delimited by wall (26) of the cylinder, cylinder head (12) and upper face (24) of piston (18), characterised in that it consists in:

determining a lower limit position (PL) of piston (18) below which wall (26) of the cylinder is likely to be wetted by the fuel jets from the injector, determining the effective position of this piston, locating this effective position of the piston in relation to the lower limit position, adjusting the fuel injection parameters according to the effective position of the piston in relation to the lower limit position.

2. A method as claimed in claim 1, characterised in that it consists in adjusting injection parameters so as to limit the penetration of fuel jets in the combustion chamber for any position of piston (18) between its lower limit position (PL) and its furthest position from cylinder head (12).

3. A method as claimed in claim 2, characterised in that it consists in injecting a determined amount of fuel under very high pressure.

4. A method as claimed in claim 3, characterised in that it consists in injecting a determined amount of fuel under a pressure above 1000 bars.

5. A method as claimed in claim 2, characterised in that it consists in injecting a determined amount of fuel for a very short length of time.

6. A method as claimed in claim 3, characterised in that it consists in repeating the injection of a determined amount of fuel until the total amount of fuel to be injected is obtained.

7. A method as claimed in claim 3, characterised in that it consists in injecting a determined amount that does not exceed 25% of the total amount of fuel to be injected.

8. A method as claimed in claim 1, characterised in that it consists in determining the lower limit position (PL) of the piston by means of the relation $D \times \tan(a_1/2)$, where D is the radial distance between the point of origin O of the fuel jets and wall (26) of cylinder (10).

9. A method as claimed in claim 1, characterised in that it consists in using injection parameters to inject the fuel in a conventional way for any position of piston (18) between its lower limit position (PL) and its closest position to cylinder head (12).

* * * * *